United States Patent
Laskaris et al.

(10) Patent No.: US 7,821,164 B2
(45) Date of Patent: Oct. 26, 2010

(54) METHOD AND APPARATUS FOR A SUPERCONDUCTING GENERATOR DRIVEN BY WIND TURBINE

(75) Inventors: Evangelos Trifon Laskaris, Schenectady, NY (US); Kiruba Sivasubramaniam, Clifton Park, NY (US)

(73) Assignee: General Electric Company, Schenectady, NY (US)

(*) Notice: Subject to any disclaimer, the term of this patent is extended or adjusted under 35 U.S.C. 154(b) by 59 days.

(21) Appl. No.: 11/675,110

(22) Filed: Feb. 15, 2007

(65) Prior Publication Data
US 2008/0197633 A1 Aug. 21, 2008

(51) Int. Cl.
*H02K 9/00* (2006.01)
(52) U.S. Cl. .................. 310/52; 310/179
(58) Field of Classification Search ............. 310/52, 310/261, 179–180
See application file for complete search history.

(56) References Cited

U.S. PATENT DOCUMENTS

| | | | | |
|---|---|---|---|---|
| 3,742,265 A | * | 6/1973 | Smith, Jr. ............ | 310/52 |
| 3,764,835 A | * | 10/1973 | Luck et al. ........... | 310/52 |
| 3,821,568 A | | 6/1974 | Gillet | |
| 3,967,145 A | * | 6/1976 | Apsit et al. .......... | 310/52 |
| 4,013,908 A | | 3/1977 | Weghaupt | |
| 4,058,746 A | * | 11/1977 | Mole et al. .......... | 310/10 |
| 4,058,747 A | * | 11/1977 | Mailfert et al. ....... | 310/52 |
| 4,396,847 A | | 8/1983 | Weghaupt et al. | |
| 4,577,126 A | * | 3/1986 | Mailfert ............. | 310/52 |
| 4,745,313 A | | 5/1988 | Brunet et al. | |
| 4,808,864 A | | 2/1989 | Brunet et al. | |
| 4,816,708 A | | 3/1989 | Laumond | |
| 5,018,357 A | | 5/1991 | Livingstone et al. | |
| 5,481,146 A | * | 1/1996 | Davey ............... | 310/90.5 |
| 5,777,420 A | | 7/1998 | Gamble et al. | |
| 5,880,547 A | | 3/1999 | Shoykhet | |
| 5,953,224 A | | 9/1999 | Gold et al. | |
| 6,066,906 A | * | 5/2000 | Kalsi ................ | 310/179 |
| 6,129,477 A | | 10/2000 | Shoykhet | |
| 6,160,336 A | | 12/2000 | Baker, Jr. et al. | |
| 6,296,084 B1 | | 10/2001 | Trustee | |
| 6,326,713 B1 | | 12/2001 | Judson | |
| 6,354,087 B1 | | 3/2002 | Nakahara et al. | |
| 6,417,578 B1 | * | 7/2002 | Chapman et al. ....... | 290/44 |
| 6,438,969 B1 | | 8/2002 | Laskaris et al. | |
| 6,442,949 B1 | | 9/2002 | Laskaris et al. | |
| 6,489,701 B1 | * | 12/2002 | Gamble et al. ........ | 310/179 |
| 6,553,773 B2 | | 4/2003 | Laskaris | |

(Continued)

FOREIGN PATENT DOCUMENTS

EP  0 805 545  11/1997

(Continued)

OTHER PUBLICATIONS

US 6,611,075, 08/2003, Kalsi (withdrawn)

*Primary Examiner*—Michael C Zarroli
(74) *Attorney, Agent, or Firm*—Nixon & Vanderhye P.C.

(57) ABSTRACT

A generator including: an annular armature connectable to rotate with blades of a wind turbine; an annular stationary field winding assembly coaxial with the armature and separated by a gap from an inside surface of the armature, wherein the field winding include superconducting coils, and support structure connectable to an upper region of a tower of the wind turbine.

25 Claims, 5 Drawing Sheets

U.S. PATENT DOCUMENTS

| | | |
|---|---|---|
| 6,679,066 B1 | 1/2004 | Funayama et al. |
| 6,700,297 B2 | 3/2004 | Hsu et al. |
| 6,725,683 B1 | 4/2004 | Laskaris |
| 6,750,588 B1 * | 6/2004 | Gabrys .................. 310/268 |
| 6,794,781 B2 * | 9/2004 | Razzell et al. ............ 310/114 |
| 6,815,860 B2 | 11/2004 | Wang et al. |
| 6,885,124 B2 | 4/2005 | Neet |
| 6,906,446 B2 * | 6/2005 | Post ..................... 310/191 |
| 7,003,977 B2 | 2/2006 | Steinbach et al. |
| 7,019,429 B1 | 3/2006 | Larsson |
| 7,042,109 B2 * | 5/2006 | Gabrys .................. 290/44 |
| 2003/0173862 A1 | 9/2003 | Wang et al. |
| 2004/0056541 A1 | 3/2004 | Steinmeyer |
| 2008/0007132 A1 * | 1/2008 | Weeber et al. ............ 310/178 |
| 2008/0161189 A1 * | 7/2008 | Lewis et al. ............. 505/121 |
| 2008/0231131 A1 * | 9/2008 | Gabrys et al. ............ 310/114 |

FOREIGN PATENT DOCUMENTS

| | | |
|---|---|---|
| EP | 1 261 118 | 11/2002 |
| FR | 2 313 795 | 12/1976 |
| GB | 2 416 566 | 2/2006 |
| JP | 61 081168 | 4/1986 |
| WO | 01/21956 | 3/2001 |

* cited by examiner

METHOD AND APPARATUS FOR A SUPERCONDUCTING GENERATOR DRIVEN BY WIND TURBINE

BACKGROUND OF THE INVENTION

This invention relates to electrical generators and, particularly, relates to wind turbines and superconducting generators.

A direct drive generator driven by the blades of the wind turbine is efficient and has minimal losses due to transmission of torque from the turbine blades to the generator. Direct drive conventional generators on wind turbine towers generally have a power rating of three (3) Mega-Watts (MW) or less.

Conventional direct drive generators typically have low torque density and become too heavy for a wind turbine tower at power ratings above 3 MW. Heavy generators with power ratings above 3 MW have been used in wind turbine towers with indirect drives, which usually include a gearbox and a shaft that allows for a compact high speed generator. Gearboxes tend to be unreliable and not suitable for long life service in a wind turbine tower.

There is a long felt need for direct drive generators for wind turbines capable of generating multi Mega Watts (MW), e.g., 10 MW, of electrical power. The needed generator should be highly reliable, and have a reasonable size and weight to allow for economical shipping and installation on a wind turbine tower.

BRIEF DESCRIPTION OF THE INVENTION

A generator comprising: an annular armature connectable to rotate with rotating component of a wind turbine; a non-rotating annular field winding coaxial with the armature and separated by a gap from the armature, wherein the field winding include superconducting coil magnets, and a non-rotating support for the field winding and connectable to an upper region of a tower of the wind turbine.

A generator for a wind turbine comprising: an annular armature driven directly by a wind turbine and rotating with a rotating component of the wind turbine; an annular field winding coaxial with the armature and separated by a gap from an inside surface of the armature, wherein the field winding includes superconducting coil magnets, and at least one re-condensor mounted at a higher elevation than the field winding.

A method for generating electrical power comprising: generating a magnetic field in a non-rotating annular field winding in a generator, wherein the field winding includes superconducting coil magnets and the generator is mounted in an upper section of a tower for the wind turbine; applying torque from the wind turbine to rotate an armature of the generator, wherein the armature is coaxial and electromagnetically coupled to the superconducting field winding; generating electrical current in the armature by the rotation of the armature around the stationary field winding; transferring the electrical current from the rotating armature to a power conversion system; cooling the superconducting coil magnets to a superconducting condition using a cooling liquid that is at least partially vaporized as it cools the coils, and condensing the vaporized cooling liquid in a re-condensor elevated above the generator, wherein the condensed cooling liquid flows by gravity to the superconducting coil magnets.

DETAILED DESCRIPTION OF THE INVENTION

A superconducting alternating current (AC) generator has been developed with a stationary field winding and a rotating armature driven directly by a wind turbine or turbine (collectively referred to as a "wind turbine.") The superconducting AC generator may be mounted in the upper region of wind turbine tower and coupled directly to the rotating component of the wind turbine, e.g., the blades. The direct drive generator is sufficiently light-weight to be mounted on top of a conventional wind turbine tower and coupled to conventional rotating wind turbine blades.

The superconducting generator provides high torque density which allows the generator to be light weight, despite the added components needed to cool and insulate the superconducting coils in the field winding. The stationary field winding includes a series of racetrack shaped superconducting coils cooled to cryogenic temperatures. The rotating armature and iron yoke (optional) are connected directly to and turned by the wind turbine. A current collector transfers three-phase currents generated by the rotating armature in the stationary stator to conductors that extend down through the frame of the wind turbine.

Figure 1:
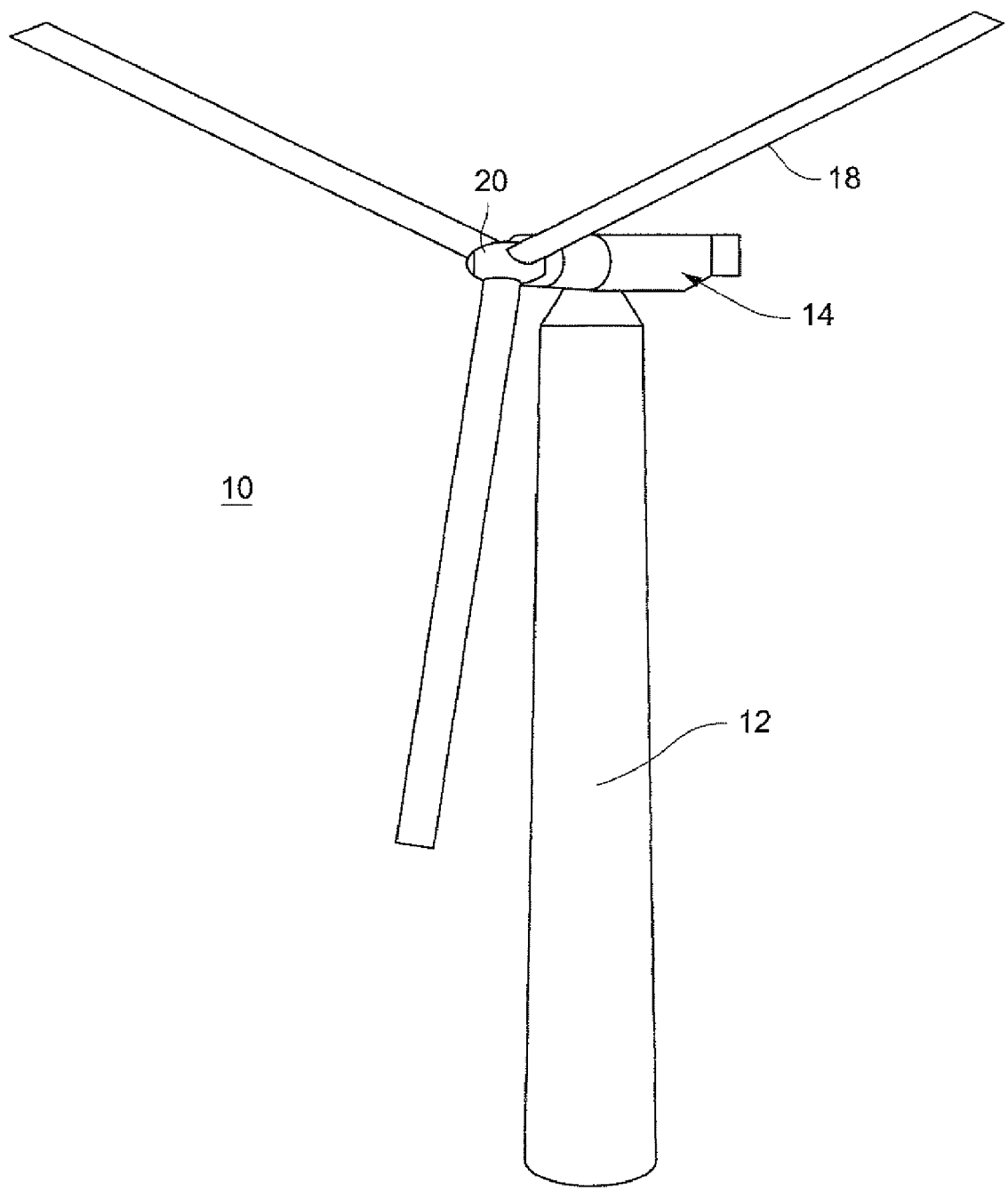
FIG. 1 is a wind turbine having a direct drive generator with superconducting electromagnetic components.

FIG. 1 is a front view of a wind turbine 10 that includes a tower 12 anchored to the ground. A superconducting generator is housed within a nacelle 14 mounted on top of the tower. The nacelle may rotate about an axis of the tower to align the turbine blades 18 with respect to the wind direction. The blades extend radially outward from a hub 20. The blades 18 typically face into the wind and are turned by the energy of the wind. A generator is housed within the nacelle 14 and is driven directly by the hub 20 and blades 18. The rotation of the blades and hub directly drives the armature of the generator.

The tower 12 may be between 20 and 100 meters in height, one to two (1 to 2) meters in diameter at the top and four (4) meters in diameter at the ground base. The tower may be constructed of tapered tubular steel, but may also be made from a lattice structure or from concrete sections. The turbine blades 18, each of 10-45 meters in length are equally spaced around the hub 20. While the blades may be made of any suitable material, they are typically formed of a glass fiber reinforced plastic or epoxy. The blades may have a fixed pitch or a variable pitch, depending on whether a variable pitch gear box is included in the hub. The dimensions of the tower and blades and their compositions are outside the scope of this application and are known to persons of ordinary skill in the art of large scale wind turbines used for electrical power generation.

Figure 2:
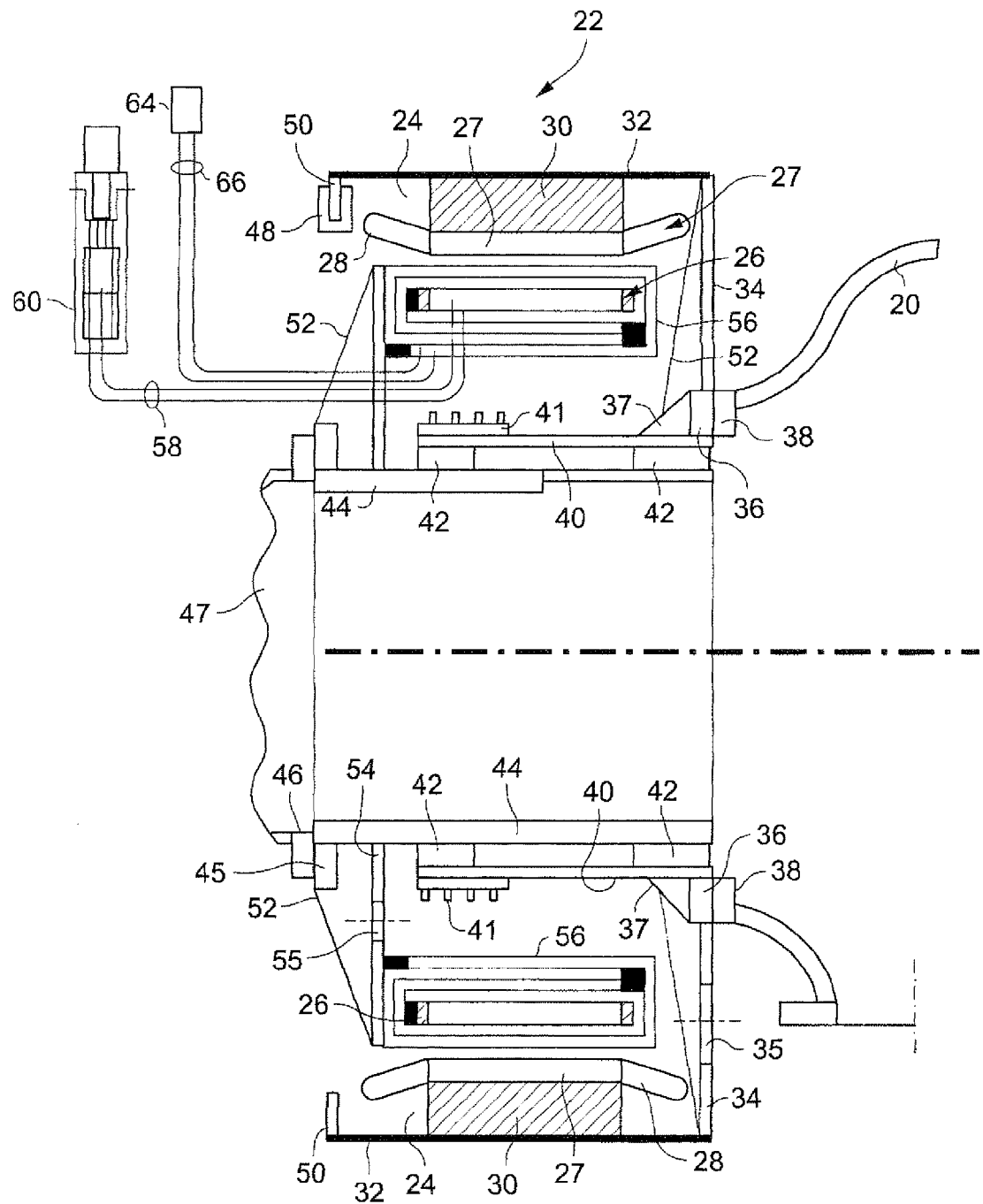
FIG. 2 is a schematic diagram showing in cross-section a direct drive generator having an annular rotating armature and a stationary super-conducting field winding surrounded by the armature.

FIG. 2 is a schematic diagram showing in cross-section a direct drive generator 22 having an annular rotating armature 24 and a stationary super-conducting field winding assembly 26 surrounded by the armature. The rotating armature 24 is an outer annular ring around the field winding assembly 26. The armature is formed conventionally and may comprise conductive windings 27, e.g., coils or bars, arranged longitudinally along the length of the armature and on an inside cylindrical surface of the armature. By way of example, the longitudinal sections of the armature windings may be 29 to 30 inches in length, have a thickness of 4 to 5 inches and an inside diameter of between 135 to 136 inches. The coils or bars may be connected at their opposite ends to one another by conductive end turns 28. The end turn connections between the longitudinal coils or bars are dependent on their number and arrangement, and the phases of electricity to be generated in the armature windings. The inside cylindrical surface of the armature windings is separated by a narrow air gap, e.g., about 1-2 inches, from the outer surface of the stationary field winding assembly.

The armature 24 includes a cylindrical yoke 30 that supports the coils and bars 27. The outer surface of the yoke 30 is fixed to a cylindrical housing 32 that rotates with the armature. The diameter of the housing 32 may be, for example, between 147 to 148 inches and have a length of 58 inches. The housing is fitted to a circular disc 34 that supports the housing and armature 24. The disc has a circular aperture at its center that is mounted to an annular bracket 36 to which is attached the annular base 38 of the hub 20 of the wind turbine. The bracket 36 and base 38 may be secured together by bolts arranged in a circular array around the bracket and base. The disc 34 may have openings or holes 35 for weight reduction.

The bracket 36 is mounted on an end of a rotating cylindrical support tube 40 which is radially inward of the armature winding. A reinforcing ring 37 is fixed to the inner corner between the bracket 36 and support tube 40. The support tube 40 may be, for example, between 62 to 63 inches in diameter. On an outside surface of the support tube 40, a slip ring assembly 41 is provided with contacts for each of the phases of AC power produced by the generator and a ground connection. The four ring contacts of the slip ring shown in FIG. 2 are appropriate for three-phase AC electrical power generation with a ground connection. The slip ring is electrically coupled to the windings of the rotating armature 24. The slip ring 41 rotates with the support tube 40. A stationary connection, e.g. carbon brushes (not shown), conducts the electricity from the slip ring and armature to wire conductors that extend down the tower 12 and are coupled to a power utility grid, factory or other electrical power load.

A pair of annular bearings 42 arranged towards opposite ends of the support tube 40 rotatably support the support tube 40 on a stationary base tube 44 is attached to a mount 47 that is supported by the floor of the nacelle. A ring bracket 46 may attach mount 47 to a bracket 45 for the base tube. Bolts secure the brackets 45, 46 together.

The pair of bearings 42 may be of the same type. Alternatively, the annular bearing 42 near the hub 20 may have a longer length, e.g., 15 to 16 inches, than the annular bearing 42 near the tower, which may have a length of 8 inches. The bearing 42 near the hub is longer because it more directly receives the downward force of the hub and blades and wind, which may be 500,000 pounds of force, and receives a bending moment from the hub, blades and wind, which moment may be $127 \times 10^6$ inch-pounds at the base 38 and bracket 36.

The support tube 40 may have constant thickness along its length. Alternatively, the base tube 44 may be thick, e.g., two inches, near the tower and thin, e.g., one inch, near the hub. The base tube may reduce in thickness in a step or a taper. The reduction in the thickness reduces the weight of the tube. Similar weight reducing features may include cut-outs or holes in the disc 34, light weight materials, e.g., composites, in the housing 32.

A disc brake 48 grasps an annular lip 50 on an end of the housing 32. The brake can slow or stop the rotation of the blades, if the wind becomes excessive and the blades rotate too fast. Thin and light weight gussets 52 extend from circular disc 34 to the support tube 40. The gussets structurally reinforce the disc 34.

The base tube 44 supports a field winding support disc 54 on which is mounted the stationary field winding assembly 26. The assembly of the base tube 44 and support disc is an exemplary non-rotating support for the field winding; assembly 26. The disc may have cut-outs or holes 55 to reduce weight. The disc 54 is attached to an end of a cryostat housing 56 containing the superconducting coils of the field winding 26. The housing 56 and its cooling components form a cryostat that cools the superconducting coils of the field winding. The housing for the cryostat 56 may be annular, rectangular in cross section, have an outside diameter of between 134 and 135 inches, and a length of 49 inches. The dimensions of the housing 56 and other components of the generator and wind turbine are a matter of design choice and may vary depending on the design of the wind turbine.

The cryostat 56 insulates the superconducting coils so that they may be cooled to near absolute zero, e.g., to 10 Kelvin (K) and preferably to 4K. To cool the windings, the housing 56 includes insulated conduits 58 to receive liquid helium (He) or other similar cryogenic liquid (referred to as cryogen). A conventional two-stage re-condensor 60 mounted in an upper region of the nacelle, on top of the nacelle or on top of the tower, and above the field windings provides cryogen, e.g., liquid He, using a gravity feed. The cryogen flows around the superconducting coil magnets of the field windings and cools the coil magnets to achieve a superconducting condition. The coils are cooled, e.g., to 4 degree K, as the He at least partially vaporizes. The He vapor flows through one of the conduits 58 to the re-condensor 60, where the He is cooled, liquified and returned via conduit 58 to the coils magnets. The power conductors for the superconducting coils also pass through the housing 56 with the insulated conduits 58 for the helium.

A second re-condensor 64 provides a second cooling liquid, e.g., liquid nitrogen or neon, to an inner thermal shield 70 of the housing 56 for the field winding. The second cooling liquid cools the thermal shield 70 for the superconducting magnets to about 30 degree K to 80 degree K. Cooling the thermal shield assists in supercooling the superconducting winding by reducing the thermal radiation heat adsorbed by the Helium. The second re-condensor 64 receives the vaporized liquid nitrogen or neon from the thermal shield 70, liquefies the nitrogen or neon, and provides liquid nitrogen or neon to the thermal shield via insulated conduits 66. The second re-condensor provides the liquid neon or nitrogen under a gravity feed and is mounted on the tower higher than the housing 56.

Torque is applied by the hub 20 to turn the armature 24 around the field winding assembly 26. The rotating support disc 34 transmits the torque from the hub to the armature. Torque is applied by the armature to the field winding assembly due to electromagnetic force (EMF) coupling. The torque applied to the field windings is transmitted by the field winding housing 56 to the stationary support disc 54 and to the mount 47 of the tower 12.

Figure 3:
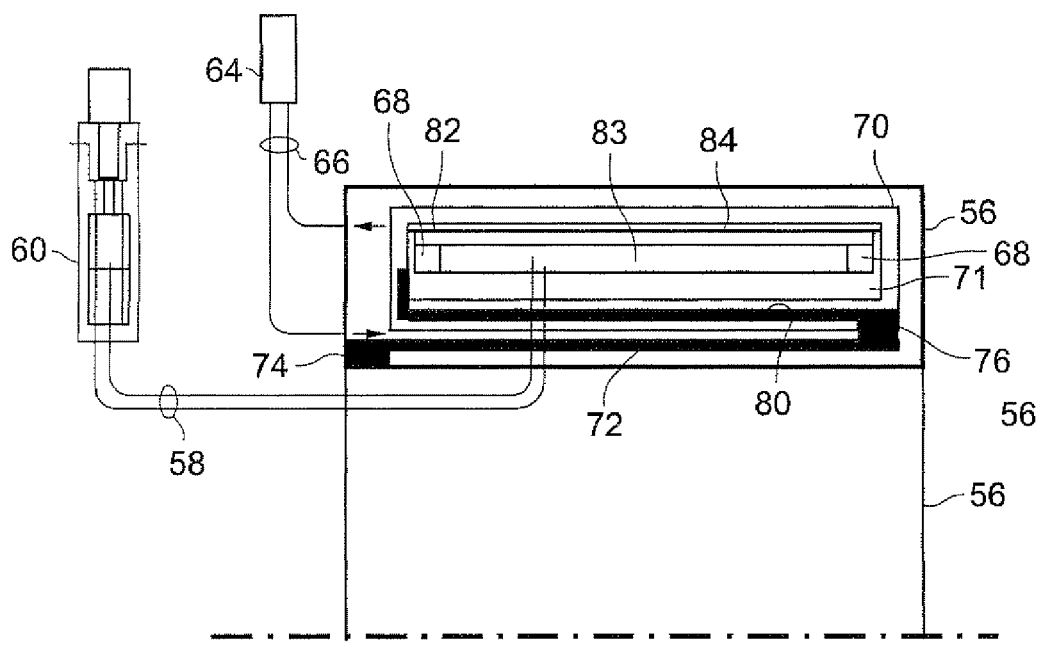
FIG. 3 is schematic diagram showing in cross-section the cryostat for the superconducting field winding.

FIG. 3 is a schematic diagram showing in cross-section the cryostat housing 56 for the superconducting coils 68. The interior of the housing is evacuated and that forms an insulating vacuum around the thermal shield 70. A first torque tube 72 suspends the thermal shield 70 in the evacuated interior of the cryostat housing 56. The torque tube 72 is mounted to an annular flange 74 inside the housing. The flange elevates the tube from the inside wall of the housing 56. Another annular flange 76, at the opposite end of the torque tube 72, elevates the thermal shield 70 from the tube and centers the thermal shield inside the housing 56. The torque tube 72 also transmits torque from the thermal shield 70 to the housing 56, and provides thermal insulation to the low temperature thermal shield from the ambient temperature housing 56. The thermal shield 70 is formed of light weight aluminum.

Suspended in the thermal shield 70 is an annular casing 71. The thermal shield 70 has one flange cooled with liquid nitrogen or neon to thermally insulate casing 71 from thermal radiation heat transfer. The liquid neon or nitrogen is supplied to the thermal shield 70 from the second re-condensor 64, which is elevated above the housing 56. Conduits 66 provide a gravity feed lien for the liquid neon or nitrogent to the thermal shield and a vapor return lien to the re-condensor. The liquid neon or nitrogen circulates through tubing attached to one flange of the thermal shield. As the liquid neon or nitrogen cools the thermal shield, the liquid is vaporized and then returned to the re-condensor. The vapor is condensed in the re-condensor and then fed back to the thermal shield 70.

A second torque tube 80, is supported on one end by a flange 76 on an inner wall of the thermal shield 70. The flange 76 may extend into the interior of the chamber 70 or may comprise two flanges (one inside the thermal shield and the other outside the thermal shield). The flanges may be formed of an insulating material. The second torque tube 80 thermally insulates and suspends the annular casing 71 from the thermal shield. The second torque tube 80 transmits torque from the coils to the first torque tube 72. Both the first and second torque tubes may be formed of titanium alloys.

The insulated conduits 58, 66 and power cables (not shown) for the superconducting coils 68 pass through sealed apertures in the housing 56, thermal shield 70 and, for the first conduit 58 to the casing 71 for the superconducting coils. The housing, thermal shield, and casing provide an insulated and cooled environment within which the superconducting coils can be cooled to cryogenic temperatures, e.g., 4 degree Kelvin. The torque tubes arranged in opposite directions thermally and mechanically isolate the windings and their casings from ambient conditions.

Figure 4:
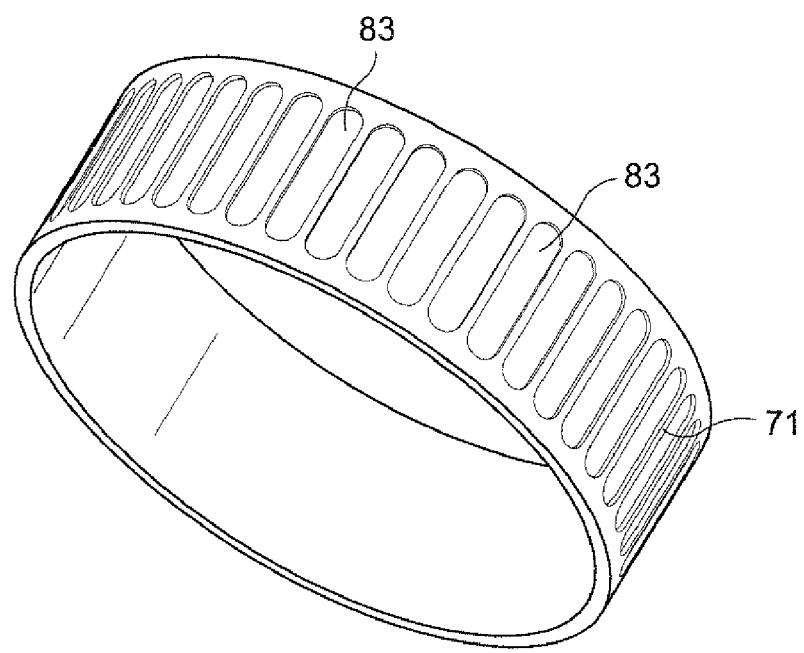
FIG. 4 is a perspective view of a casing ring which supports the coil magnets of the superconducting field winding.

FIG. 4 is perspective view of the casing 71, which forms a vessel to hold the coil magnets 68 in contact with liquid He. The casing 71 may be formed of light weight aluminum. The casing may be annular and rectangular in cross section. The curvature of the casing conforms to the curvature of the annular chamber 70. The casing may include an annular array of hollow recesses 83 that each receive a race-track shaped coil 68 and a supply of liquid helium. A support bracket 82 is seated in the recess and above each coil magnet. The support bracket conforms to the coil and secures the coil in the recess 83 of the casing. The support bracket allows the cooling liquid to flow over and through superconducting coils. The cooling passages for the superconducting coils are conventional and well known, such as use of superconducting coil magnets for magnetic resonance imaging (MRI) devices.

A cover cylindrical shell 84 seals the hollow center of the casing 71. The casing 71, thermal shield 70 and housing 56 are relatively thin so that the field windings may be positioned near the rotating windings of the armature 24. In the disclosed embodiment, the superconducting field windings, which may have a thickness of about 2-3 inches, may be within two to four inches of the armature windings.

Each superconducting coil 68 may be a group of wires formed in a racetrack shape. The coils are potted to retain the racetrack shape. Each racetrack may have a longitudinal section of two parallel sections that is 29 to 30 inches long and a width of 10 inches, for example.

Each superconducting coil 68 is supported in a recess 83 in the casing 70 and is cooled by a bath of helium to cryogenic temperatures. The superconducting coils 68 are arranged side by side in an annular array extending around the casing. For example, thirty-six (36) coils may form an annular array of field windings that serve as the stator field winding for the generator. The superconducting coils 68 may be each formed of (NbTi) wire wrapped in a helix around a racetrack form that may include cooling conduits for the helium.

Figure 5:
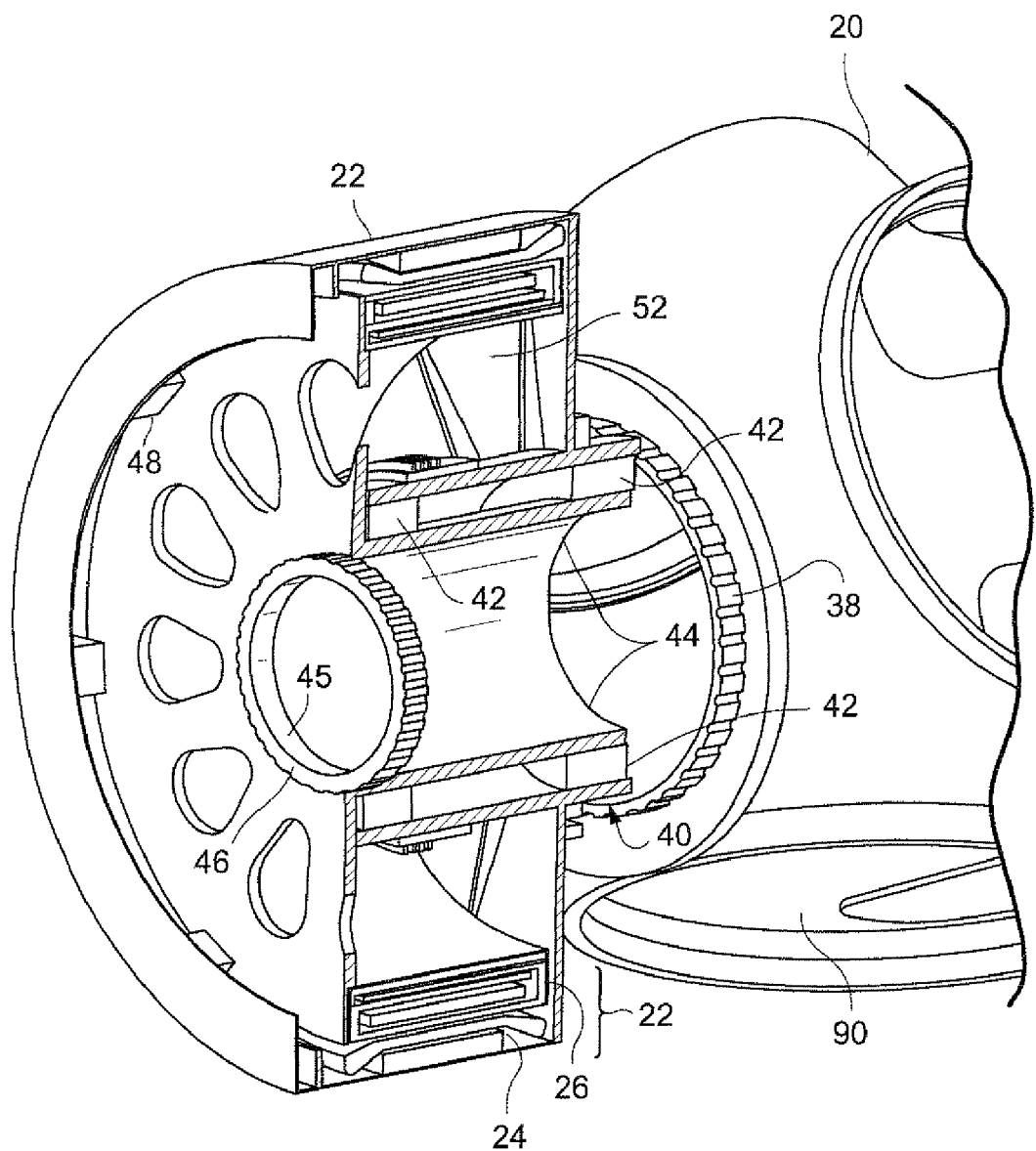
FIG. 5 is a rear and side perspective view of the generator and hub for the wind turbine.

FIG. 5 is an enlarge view of the rear and side of the generator 22 and its connection to the hub 20. The hub has apertures 90 for the blades. The root of a blade has a cylindrical mount that is fitted to the rim of the aperture. The blade may be fixed to the nose or provided with gearing for a variable pitch mounting of the blade to the hub. The hub 20 includes a base 38 that mounts to flange 36 of the generator 22. A circular array of bolts may extend through slots in the base to secure the hub to the flange 36.

Figure 6:
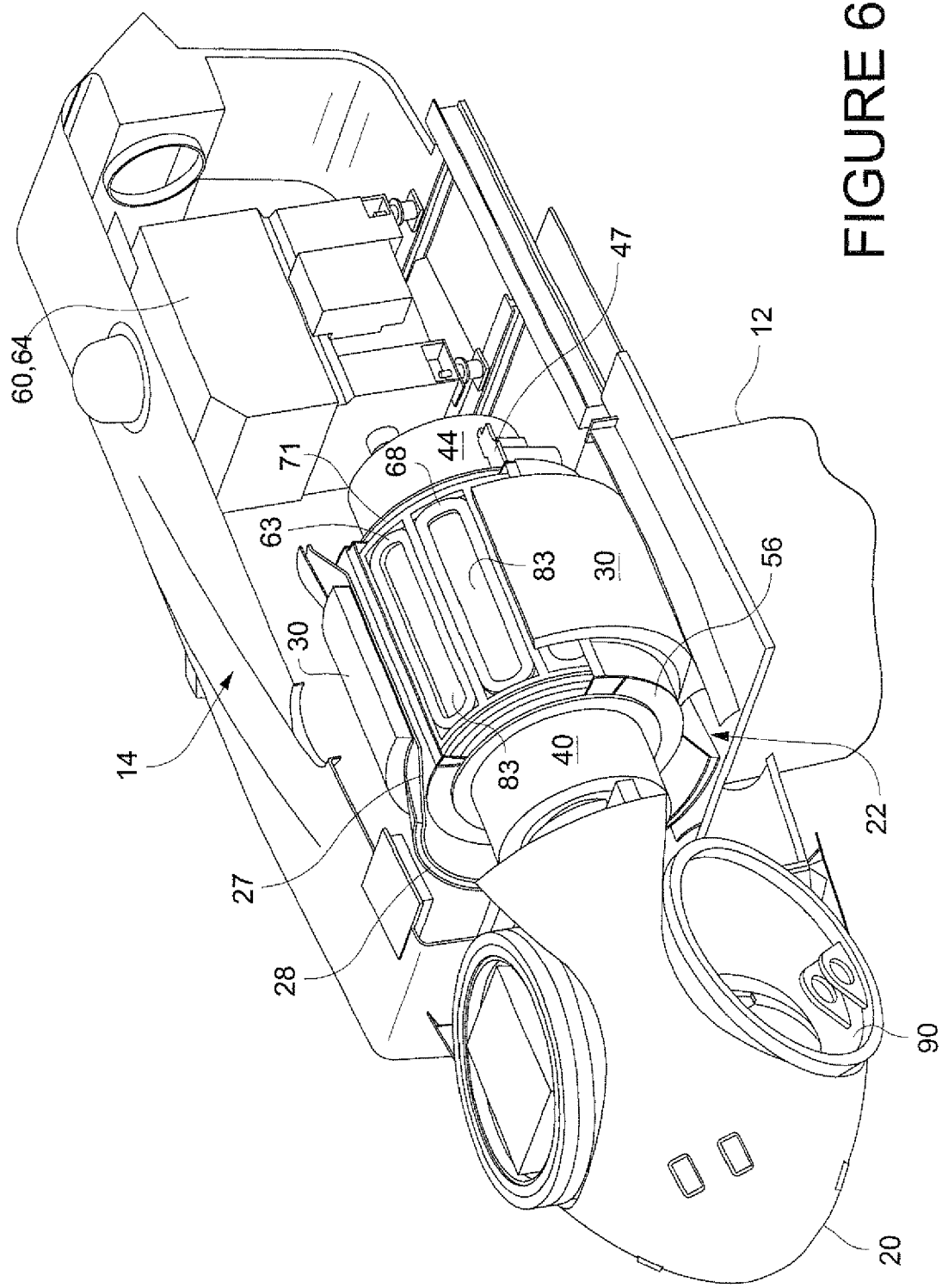
FIG. 6 is a partially cross-sectional view of the nacelle, generator, and hub for the wind turbine.

FIG. 6 is a perspective view, partially in cross-section, of the generator 22 housed in the nacelle 14 and directly connected to the hub 20 of the wind turbine. The support tube 40 is connected directly to the hub. The support tube also supports the armature with the armature windings 27, 28 and yoke 30. The armature windings are coaxial with and rotate about the superconducting coil magnets 68. These coil magnets are enclosed in the casing 71 and receive cryogen through cooling passages 83. The casing 71 is supported in a cryostat housing 56 which is fixed to a base tube 44. A mount 47 supports the base tube 44 within the nacelle 14.

The cryogen re-condensors 60, 64 may be housed in the nacelle, provided that the cryogen cooling liquid in the recondensors is at least partially elevated above the superconducting field windings to provide for gravity feed of the cryogen to the windings. Alternatively, the re-condensors 60, 64 may be mounted on top of the nacelle.

A generator with superconducting field windings and an outer armature, as described above, would have high torque density and be of relatively light weight. The generator may achieve a power output of 10 MW or more and be light weight to fit on top of a tower of a wind turbine. The generator is directly driven by the blades of the wind turbine. The 10 MW or more of electrical power is transferred from the armature, through the slip rings and to an electrical conductor that extends down the tower and to an electrical coupling at the base of the tower. The electrical coupling may connect to a power utility, electrical load in a building, factory or home, or other electrical load.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A generator comprising:
   an annular armature connectable to rotate with a rotating component of a wind turbine;
   a non-rotating annular field winding coaxial to the armature and separated by a gap from the armature, wherein the field winding includes superconducting coil magnets;
   a non-rotating support for the field winding;
   a torque transmission arm coupling the non-rotating support for the field winding to a base fixed to an upper region of the tower, wherein the torque transmission arm is connected at one end region to the non-rotating support and is connected at an opposite end region to the base, and wherein the torque transmission arm suspends the field winding over the base, and at least one re-condenser mounted above the array of field windings.

2. The generator in claim 1 wherein the annular field winding is radially inward of the gap and armature.

3. A generator comprising:
an annular armature connectable to rotate with a rotating component of a wind turbine;
a non-rotating annular field winding coaxial to the armature and separated by a gap from the armature, wherein the field winding include superconducting coil magnets, and
a non-rotating support for the field winding and connectable to an upper region of a tower of the wind turbine, wherein the non-rotating support includes an insulating annular housing for the field winding, and the housing is mounted by a torque tube to a base fixed to the upper region of the tower.

4. A generator comprising:
an annular armature connectable to rotate with a rotating component of a wind turbine;
a non-rotating annular field winding coaxial to the armature and separated by a gap from the armature, wherein the field winding include superconducting coil magnets, and
a non-rotating support for the field winding and connectable to an upper region of a tower of the wind turbine, wherein the non-rotating support includes an insulating housing for the array of coil magnets, an annular chamber suspended by a torque tube in an evacuated interior of the housing, and further the annular chamber includes an annular casing enclosing the coil magnets.

5. A generator as in claim 4 further comprising a disc rotating with the armature and a brake releasably grasping the disc.

6. A generator as in claim 4 further comprising insulated conduits for the superconducting coil magnets extending through the insulating housing and upward to a re-condenser mounted above the field winding.

7. A generator for a wind turbine mounted on a tower comprising:
an annular armature driven directly by a wind turbine and rotating with a rotating component of the wind turbine;
a non-rotating annular field winding coaxial to the armature and separated by an annular gap from the armature, wherein the field winding includes superconducting coil magnets;
a non-rotating support for the field winding;
a torque transmission arm coupling the non-rotating support for the field winding to a base fixed to an upper region of the tower, wherein the torque transmission arm is connected at one end region to the non-rotating support and is connected at an opposite end region to the base and wherein the torque transmission arm suspends the field winding over the base and
at least one re-condenser mounted at a higher elevation than the field winding.

8. A generator for a wind turbine as in claim 7 wherein the generator is mounted on top of a tower.

9. A generator for a wind turbine as in claim 7 wherein the coil magnets are arranged in an annular array of racetrack shaped superconducting coil magnets.

10. The generator in claim 7 wherein the field winding is radially inward of the armature.

11. A generator for a wind turbine comprising:
an annular armature driven directly by a wind turbine and rotating with a rotating component of the wind turbine;
an annular field winding coaxial with the armature and separated by a gap from an inside surface of the armature, wherein the field winding includes superconducting coil magnets;
at least one re-condenser mounted at a higher elevation than the field winding, and
an insulating annular housing for the field winding, wherein the housing is mounted by a torque tube to a base.

12. A generator for a wind turbine as in claim 11 further comprising insulated conduits for a cooling fluid for the coil magnets extending through the insulating housing and upward to a re-condenser mounted above the field winding.

13. A generator for a wind turbine comprising:
an annular armature driven directly by a wind turbine and rotating with a rotating component of the wind turbine;
an annular field winding coaxial with the armature and separated by a gap from an inside surface of the armature, wherein the field winding includes superconducting coil magnets;
at least one re-condenser mounted at a higher elevation than the field winding, and
an insulating housing for the field winding, an annular chamber suspended by a torque tube in an evacuated interior of the housing, and the chamber containing an annular casing having the field winding and a supply of a circulating cryogen to cool the coil magnets of the field winding.

14. A generator for a wind turbine comprising:
an annular armature driven directly by a wind turbine and rotating with a rotating component of the wind turbine;
non-rotating annular field winding coaxial with the armature and separated by a gap from an inside surface of the armature, wherein the field winding includes superconducting coil magnets;
a torque transmission arm supporting a non-rotating support for the field winding on a base fixed to an upper region of the tower, wherein the torque transmission arm has a first end coupled to the field winding and a second end attached to the base and the torque transmission arm suspends the field winding over the base;
at least one re-condenser mounted at a higher elevation than the field winding, and
a disc rotating with the armature and a brake releasably grasping the disc.

15. The generator of claim 14 wherein the annular field winding is radially inward of the armature.

16. A method for generating electrical power comprising:
generating a magnetic field in a non-rotating annular field winding in a generator, wherein the field winding includes superconducting coil magnets and the generator is mounted in an upper section of a tower for a wind turbine;
applying torque from the wind turbine to rotate an armature of the generator, wherein the armature is coaxial and electromagnetically coupled to the superconducting field winding;
generating electrical current in the armature by the rotation of the armature around the stationary field winding;
transferring the electrical current from the rotating armature to a power conversion system;

cooling the superconducting coil magnets to a superconducting condition using a cooling liquid that is at least partially vaporized as it cools the coils, and condensing the vaporized cooling liquid in a re-condenser elevated above the generator, wherein the condensed cooling liquid flows by gravity to the superconducting coil magnets.

17. A method as in claim 16 further comprising supporting the coil magnets in an insulating housing and supporting the housing with a torque tube.

18. A method as in claim 16 further comprising transmitting torque applied by a blade of the wind turbine to the armature through an electromagnetic coupling between the armature and field winding and from the winding to the tower.

19. A method as in claim 16 further comprising supporting the coil magnets in annular casing and cooling the coil magnets with liquid helium flowing through the casing.

20. A method as in claim 19 further comprising insulating the casing by suspending the casing in a hollow chamber and suspending the chamber in an evacuated housing.

21. A generator comprising:

an annular armature;

an annular field winding coaxial with the armature and separated by a gap from an inside surface of the armature, wherein the field winding includes superconducting coil magnets;

wherein one of the annular armature and the annular field winding rotates and is connectable to rotate with a rotating component of a wind turbine;

a stationary support connectable to an upper region of a tower of the wind turbine, and wherein another one of the annular armature and the annular field winding is stationary and is supported by a torque transmission arm to the stationary support, wherein the torque transmission arm has a first end coupled to the annular field winding and a second arm coupled to the stationary support and the torque transmission arm suspends the field winding adjacent to the stationary support.

22. A generator as in claim 21 wherein the armature is connectable to rotate with at least one blade of the wind turbine, and the annular field winding is stationary and connected to the stationary support.

23. A generator comprising:

an annular armature connectable to rotate with a rotating component of a wind turbine;

a non-rotating annular field winding coaxial to the armature and separated by a gap from the armature, wherein the field winding includes superconducting coil magnets seated in a cylindrical casing coaxial to the armature such that each superconducting coil magnet is at a uniform radial distance from a rotating axis of the rotating component, and further wherein the annular field winding, gap and armature are aligned radially with respect to the rotating axis, and a non-rotating support for the field winding and connectable to an upper region of a tower of the wind turbine.

24. A generator comprising:

an annular armature connectable to rotate with a rotating component of a wind turbine mounted on a tower;

a non-rotating annular field winding coaxial to the armature and separated by a gap from the armature, wherein the field winding includes superconducting coil magnets;

a non-rotating support for the field winding;

a fixed support having a first connection to the non-rotating support for the field winding and a second connection to a base fixed to an upper region of the tower, wherein the fixed support suspends the field winding in a fixed position over the base, and further wherein the fixed support includes a torque transmission arm and, at least one re-condenser mounted above the array of field windings.

25. A generator comprising:

an annular armature connectable to rotate with a rotating component of a wind turbine mounted on a tower;

a non-rotating annular array of field windings coaxial to the armature and separated by a gap from the armature, wherein the array of field windings includes superconducting coil magnets;

a non-rotating support for the array of field windings, wherein a first torque transmission support couples the array of field windings to the non-rotating support;

a second torque transmission support suspends the non-rotating support over a base fixed to an upper region of the tower, and at least one re-condenser mounted above the array of field windings.

\* \* \* \* \*

UNITED STATES PATENT AND TRADEMARK OFFICE
CERTIFICATE OF CORRECTION

| | | |
|---|---|---|
| PATENT NO. | : 7,821,164 B2 | Page 1 of 1 |
| APPLICATION NO. | : 11/675110 | |
| DATED | : October 26, 2010 | |
| INVENTOR(S) | : Evangelos Laskaris et al. | |

It is certified that error appears in the above-identified patent and that said Letters Patent is hereby corrected as shown below:

At Column 4, lines 10-11, delete "field winding; assembly 26" and insert --field winding assembly 26--

In the Claims:

Claim 7, at Column 7, lines 53-55, delete "field winding to a base" and insert --field winding and to a base--

Signed and Sealed this

Twenty-first Day of December, 2010

David J. Kappos
*Director of the United States Patent and Trademark Office*